United States Patent [19]
Sakashita et al.

[11] Patent Number: 5,606,208
[45] Date of Patent: Feb. 25, 1997

[54] BRUSHLESS MOTOR HAVING TERMINALS FOR CONNECTING WINDING ENDS TO CIRCUIT BOARD LANDS

[75] Inventors: Hiroshi Sakashita; Eiji Arasaki, both of Komagane, Japan

[73] Assignee: Sankyo Seiki Mfg. Co., Ltd., Nagano-ken, Japan

[21] Appl. No.: 244,472

[22] PCT Filed: Nov. 30, 1992

[86] PCT No.: PCT/JP92/01572

§ 371 Date: Aug. 9, 1994

§ 102(e) Date: Aug. 9, 1994

[87] PCT Pub. No.: WO93/11597

PCT Pub. Date: Jun. 10, 1993

[30] Foreign Application Priority Data

Nov. 29, 1993 [JP] Japan ................. 3-105676 U

[51] Int. Cl.[6] .............. H02K 11/00; H02K 5/00
[52] U.S. Cl. .............. 310/71; 310/91; 310/194
[58] Field of Search .................. 310/71, 68 R, 310/91, 194, 260, 40 MM, DIG. 6, 67 R

[56] References Cited

U.S. PATENT DOCUMENTS

| | | | |
|---|---|---|---|
| 4,361,773 | 11/1982 | Mokrzycki | 310/71 |
| 4,616,149 | 10/1986 | Best | 310/71 |
| 4,633,110 | 12/1986 | Genco et al. | 310/71 |
| 4,779,330 | 10/1988 | Genco et al. | 29/596 |
| 4,800,307 | 1/1989 | Papst | 310/67 R |
| 5,173,628 | 12/1992 | Yoshida et al. | 310/71 |
| 5,214,331 | 5/1993 | Yonei | 310/71 |
| 5,264,816 | 11/1993 | Degenhart et al. | 336/192 |
| 5,280,207 | 1/1994 | Nishmura | 310/67 R |
| 5,521,779 | 5/1996 | Arakawa et al. | 360/108 |

FOREIGN PATENT DOCUMENTS

| | | |
|---|---|---|
| 54-6802 | 3/1979 | Japan . |
| 58-193749 | 12/1983 | Japan . |
| 63-51542 | 4/1988 | Japan . |
| 2-32861 | 7/1990 | Japan . |

Primary Examiner—Steven L. Stephan
Assistant Examiner—Jonathan Link
Attorney, Agent, or Firm—McAulay Fisher Nissen Goldberg & Kiel, LLP

[57] ABSTRACT

A structure of the terminals of a brushless motor, which enables the motor to be thin and enables enables the windings of the motor to be connected to a circuit board easily and automatically is provided. This brushless motor comprises: a rotor section having a rotor magnet; a stator section having windings opposed to the rotor magnet (9) in the radial direction of the motor and having a stator core around which the windings are wound; a driving circuit formed on a surface of a circuit board electrically connected to the windings wound around the stator core; terminals (6), each having a clipping portion which holds and is electrically connected to the winding and having a connection portion which is electrically connected to a land part of the driving circuit on the circuit board, for repositioning the electrical connection between the windings and the driving circuit; and a core holder for holding the terminals. The terminals are provided on the surface of the core holder, the surface being opposed to the circuit board. At least the clipping portions and the connection portions are in parallel with the circuit board, and the connection portions are nearer to the circuit board than the clipping portions.

9 Claims, 8 Drawing Sheets

BRUSHLESS MOTOR HAVING TERMINALS FOR CONNECTING WINDING ENDS TO CIRCUIT BOARD LANDS

BACKGROUND OF THE INVENTION

1. Technical Field

The present invention relates to a brushless motor. More particularly, the present invention relates to a brushless motor used as a driving source for an electric product such as a video tape recorder or a floppy disk drive.

2. Background Art

A brushless motor of magnet-rotating type comprises a rotor section having a rotor magnet, a stator section having a stator core around which windings are wound, and a driving circuit for controlling the current applied to the windings of the stator core or the like.

Figure 13:
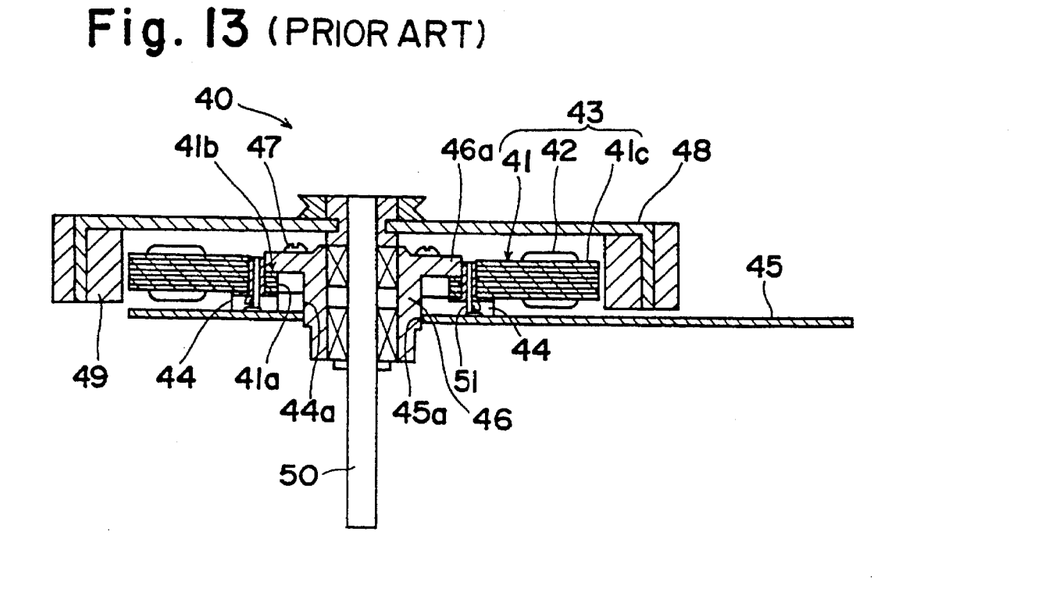
FIG. 13 is a vertical mid-sectional view showing a conventional brushless motor.
Figure 14:
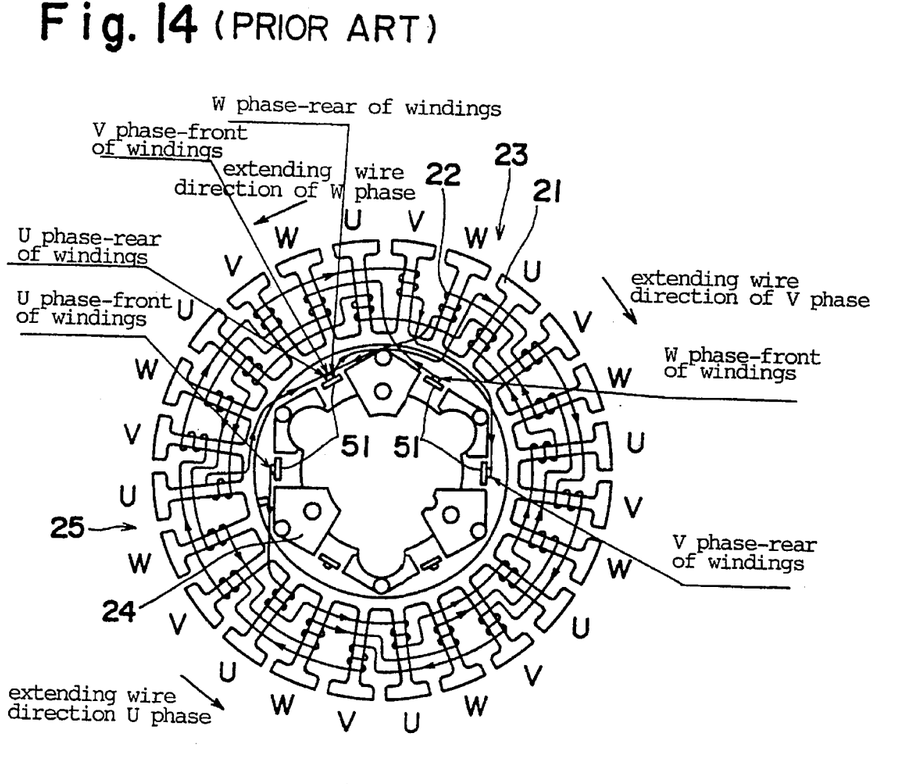
FIG. 14 is a plan view showing the core winding unit of the motor illustrated in FIG. 13.

As shown in FIG. 13, the stator section of such a brushless motor comprises, for example, a core winding unit 43 composed of a stator core 41 and windings 42 wound around respective salient poles 41c, of the stator core 41; an electrical insulating resin type core holder 44 mounted on a circuit board 45 for supporting the stator core 41 and extending wires between windings 42 while being in the electrically insulated state to the circuit board 45; and terminals 51 fixed on the core holder 44 for relaying the electrical connection between the windings 42 of each phase and a driving circuit on the circuit board 45. Further, the rotor section comprises a ring-shaped rotor magnet 49; a rotor case 48 having the rotor magnet 49 fixed thereto; and a rotary shaft 50 for fixing and supporting the rotor case 48. The rotor section and the stator section are opposed to each other in such a manner that the rotor magnet 49 is positioned outside the stator core 41 and a gap is formed radially between the outer peripheral surface of the salient poles 41c and the rotor magnet 49. The rotary shaft 50 of the rotor section is supported by a bearing holder 46 fixed to the stator core 41. The bearing holder 46 is inserted from the upper part of the stator core 41 so as to pierce into a through hole 41a formed at the center of the stator core 41, a through hole 44a provided at the center of the core holder 44 and a through hole 45a on the circuit board 45, and is fixed to the circuit base board 45 together with the stator core 41 by means of a screw 47 so that a flange part 46a formed on the base of the bearing holder 46 is engaged with a shoulder part 41b of the stator core 41.

Figure 15:
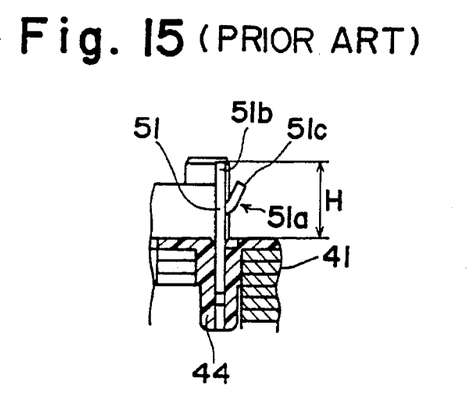
FIG. 15 is an enlarged sectional view showing a terminal portion of the core winding unit illustrated in FIG. 14.

In the conventional brushless motor having such an arrangement, the windings 42 of the stator core 41 are electrically connected with the driving circuit (not shown) formed on the circuit board 45 through terminals, or by direct soldering when no terminal is used. For example, in the case of the brushless motor 40 shown in FIG. 13, the windings 42 of U, V and W phases are linked to the driving circuit on the circuit board 45 through terminals 51 fixed to the core holder 44 by a three-phase star connection. As shown in FIGS. 13 and 15, each terminal 51 is formed by a straight flat plate having a clipping portion 51a at a tip thereof and protrudes toward the circuit board 45, and then, the respective terminals 51 are fixed to the core holder 44 so as to be perpendicular to the circuit board 45. The front or rear end portions of the windings 42 of each phase are held by the clipping portions 51a protruding from the core holder 44 toward the circuit board 45, and tip portions 51b are soldered to land parts of the circuit board 45. By the way, the ends of the windings 42 are temporarily fixed to the terminals 51 by holding the ends of the windings 42 by the clipping portions 51a, and thereafter the ends of the windings 42 are electrically connected securely to the terminals 51 by fusing.

When the terminal 51 such as shown in FIG. 15 is used, however, it is necessary to have a space equal to a height H between the core holder 60 and the circuit board 45, since the terminal 51 protrudes so as to come into contact with the circuit board 45 vertically. The height H is obtained by adding the height (the length of a tongue part 51c branching from the body of the terminal 51) of the clipping portions 51a for holding the end of the winding 42, the space in which an electrode (not shown) for fusing can be arranged therein, and a length of a connection end portion 51b with which soldering is enabled. When using such a terminal 51, the reduction in the thickness of the brushless motor 40 becomes difficult. When the length of the tongue part 51c is shortened in order to reduce the height of the clipping portion 51a, it becomes difficult to hold the end of the winding 42 or the extending wire, since if it is not held, a failure may be caused. Thus, a sufficient length is required for the holder 51a.

Figure 16:
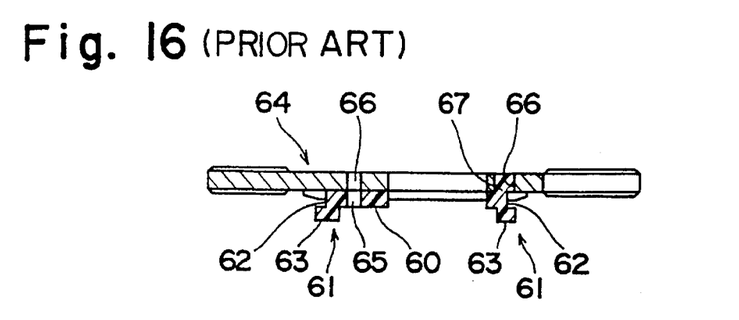
FIG. 16 is a sectional view showing the core winding unit of another conventional brushless motor.
Figure 17:
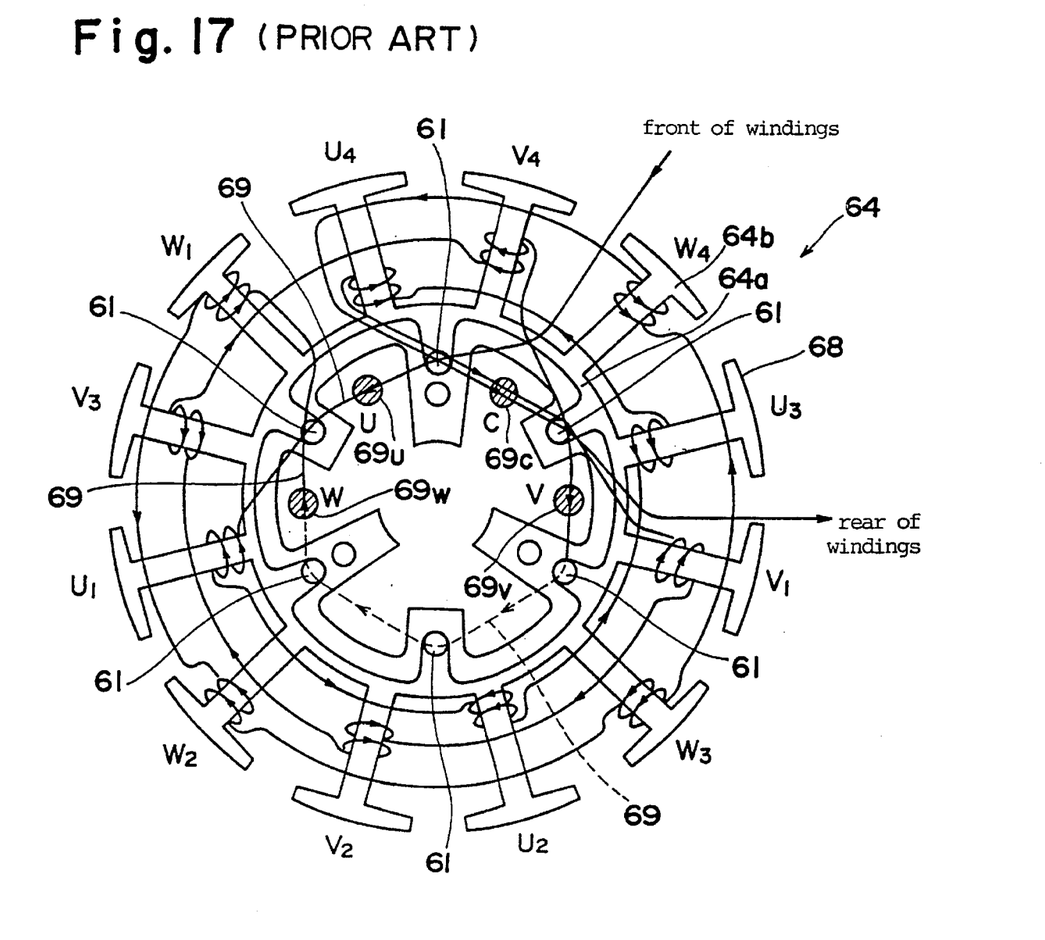
FIG. 17 is an enlarged plan view showing the same core winding unit in FIG. 16.

Further, as shown in FIGS. 16 and 17, windings may be connected to a driving circuit by means of a core holder using no electrical connection terminals such as aforementioned terminals 51. This core holder 60 is formed by an electrical insulating resin type ring held against one plane of a ring part 64a of a stator core 64 which is on a side disposed on the circuit board, and its guide members 61, for supporting extending wires of the windings 68 wound around respective salient poles 64b of the stator core 64, are formed at six positions with an equal interval therebetween. Each of the guide members 61 comprises a wire guide part 62 projecting toward a circuit board and an overhang part 63 protruding like eaves in the radial direction of the motor above the wire guide part 62 in order to prevent extending wires from coming off. The core holder 60 is fixed to the stator core 64 by thrusting a plurality of protruding parts 67 into each hole 66 of a ring part 64a of the stator core 64, the plurality of protruding parts 67 being formed on the other plane of the core holder 60 opposite with the plane of the same having the projecting guide member 61. In the case of this core holder 60, the windings 68 are wound around each salient pole 64b of the stator core 64 while hooking and drawing the windings 68 at the guide parts 61 provided at six places as shown in FIG. 17, and the extending wires are adhered between the guide parts 61 to land parts of a driving circuit which are on a side disposed on the circuit board (not shown). The extending wires are fixed to the circuit board in the following manner. First, the extending wires between the guide parts 61 are pressed toward the circuit board and are brought into contact with corresponding land parts (portion designated by the hatching in the drawing) 69u, 69v, 69w and 69c. Thereafter, soldering is carried out. Second, the extending wire between specific guide parts 61, for example, the extending wire between V and W phases, is cut and eliminated.

However, when using the core holder 60 shown in FIG. 16, the coating of the extending wire between the guide members 61 must be peeled off while maintaining the winding as it is in order to carry out the soldering on the circuit board side, therefore, there is a problem of low productivity. In addition, when the windings 69 are soldered to the land parts 69u, 69v, 69w and 69c on the circuit base board, it is necessary to press down and sag the extending wires stretched between one guide part 61 and the other guide part 61, thus requiring the manual operation. Consequently, productivity is remarkably lowered. Further, since the midways of the extending wires are pulled toward the circuit board to be soldered on the land parts 69u, 69v, 69w and 69c, the extending wires may be snapped or the soldering may be come off due to the vibration or shock given to component members during or after the manufacturing of the motor, thereby deteriorating the reliability.

OBJECT AND SUMMARY OF THE INVENTION

It is an object of the present invention to provide a structure of the terminals of a brushless motor which enables the motor to be thin. It is another object of the present invention to provide a design of a brushless motor which enables a reduction of the processing steps from the winding step on a stator core to the connecting step on a circuit board, which enables the automation of the soldering step and which also enables a reduction in cost.

To achieve those objects, a brushless motor according to the present invention comprises: a rotor section having a rotor magnet; a stator section having windings opposed to the rotor magnet in the radial directions of the motor and having a stator core around which the windings are wound; a driving circuit provided on a circuit board electrically connected to the windings wound around the stator core; terminals, each having a clipping portion which holds a winding and is electrically connected to the winding and having a connection portion which is electrically connected to a land part of the driving circuit on the circuit board, for repositioning the electrical connection between the winding and the driving circuit; and a core holder for holding the terminals, wherein the terminals are provided to the core holder on a plane opposed to the circuit board, at least the clipping portions and the connection portions being disposed substantially parallel with the circuit board, and wherein connection portions are provided at a position closer to the circuit board than the clipping portions.

Therefore, according to one aspect of the present invention, even when providing clipping portions whose lengths are sufficient to easily and securely hold ends of the windings or extending wires, a space between the core holder and the circuit board can be reduced to a necessary minimum because they are provided substantially parallel with the circuit board, thereby thinning the brushless motor. Further, in accordance with another aspect of a brushless motor of the present invention, providing a circuit board at a predetermined position realizes the appropriate mounting of the connection portions of the terminals to which the ends of the windings are connected onto land parts of the driving circuit on the circuit board, so that the automatic assembly is enabled by a method similar to that used when mounting other electric component members onto the circuit base board, e.g., a reflow soldering method. Furthermore, in accordance with the invention it is realized that the labor of the winding operation to form windings around the stator core and that of the connecting operation to connect the winding to the circuit board are substantially reduced by mechanization, and therefore, the elimination of the assembly steps leads to reduction in the manufacturing cost.

The core holder preferably comprises: first mount parts on which the connection portions of terminals are mounted and which support the connection portions at positions where the connection portions may be connected electrically to the land parts of the circuit base board; and second mount parts on which the clipping portions of terminals are mounted and which support the holder portions at positions apart from the circuit board, and more preferably each of the first and the second mount parts is constituted by a stand portion having a different height from each other in the direction of the thickness of the stator core. In this case, each terminal is backed up by each mount part so that the electrical connection between the driving circuit of the circuit board and the connection portion and the fixation between the terminal and the core holder are stably and securely performed. In addition, the core holder separately includes a holder portion for holding the terminal and a positioner portion which comes into contact with the stator core and the circuit board and which positions the stator core in the thickness direction thereof, or the holder portion also functions as the positioner portion. The positioning of the terminals to the core holder and the terminals to the land parts of the driving circuit on the circuit board are automatically performed by simply fixing the terminals to the core holder. Moreover, the core holder has holes into which electrodes for fusing are inserted at positions to which the clipping portions of the terminals are arranged, and the space between the core holder and the circuit board, i.e., the gap between the clipping portions and the connection portions of the terminals can be restricted to a size with which the electrodes for fusing can be disposed or to a smaller size.

For a better understanding of the present invention, reference is made to the following description and accompanying drawings while the scope of the invention will be pointed out in the appended claims.

DESCRIPTION OF THE PREFERRED EMBODIMENTS

Brushless motors according to the present invention will now be described in detail with reference to embodiments illustrated in the accompanying drawings.

Figure 1:
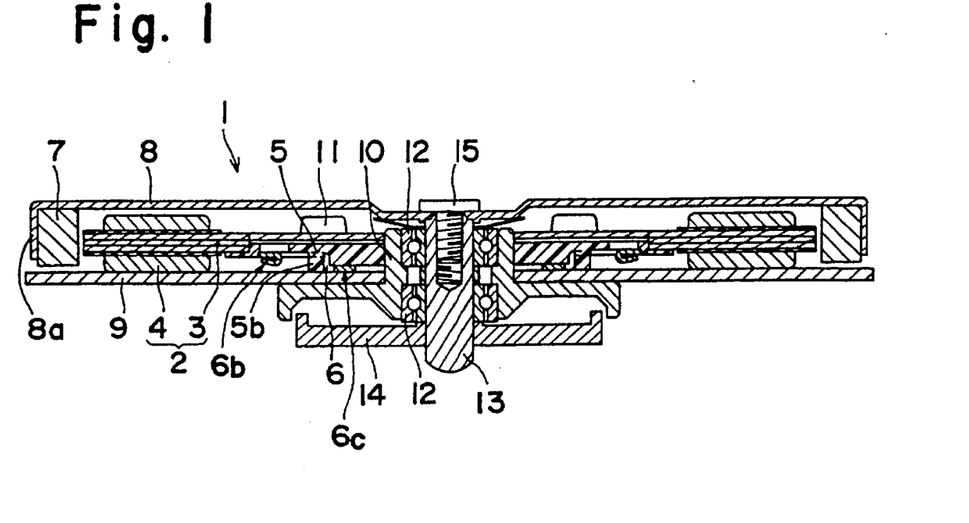
FIG. 1 is a vertical mid-sectional view showing an embodiment in which the present invention is applied to a spindle motor.
Figure 2:
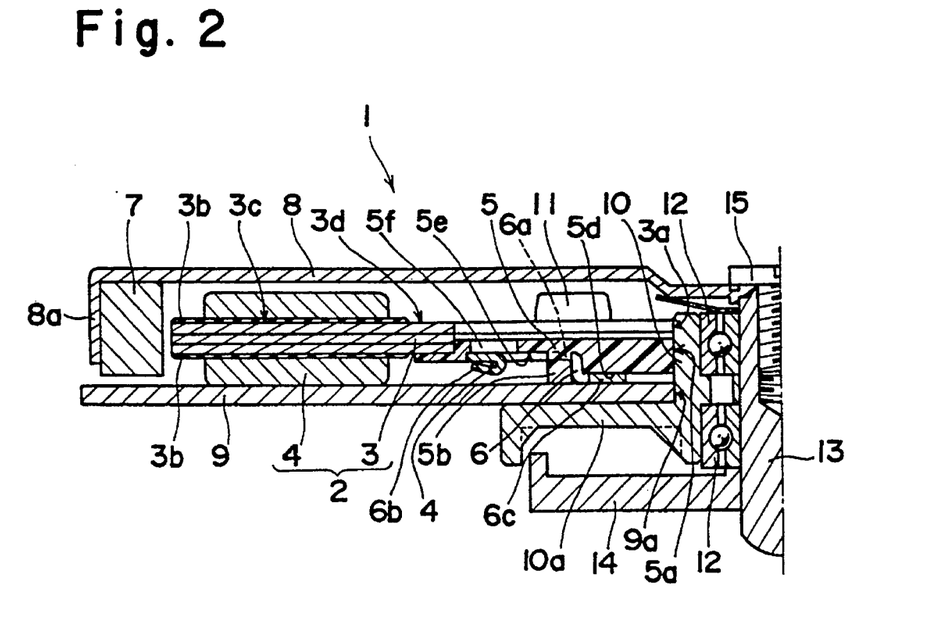
FIG. 2 is a sectional view showing an enlarged primary part of the same spindle motor.

FIGS. 1 and 2 show an example of a spindle motor to which the present invention is applied. This spindle motor is roughly constituted by a rotor section having a rotor magnet, a stator section having a stator core around which windings are wound and a driving circuit 18 for controlling currents or the like supplied to the windings of the stator section, which is similar to a conventional apparatus.

The stator section comprises: a core winding unit 2 having a stator core 3 around which windings 4 are wound; a ring type core holder which is fixed to the stator core 3 and mounts the stator core 3 on a circuit board 9 in the electrically insulated condition; and terminals 6 which are fixed to the core holder 5 and relays the electrical connection between the windings 4 in each phase and the driving circuit 18 formed on a surface of the circuit board 9. Further, the rotor section comprises a rotary shaft 13, a rotor case 8 fixed to the rotary shaft 13 by a screw 15, and a rotor magnet 7. The rotor magnet 7 is fixed to the inner peripheral wall of a flange part 8a provided on the outer periphery of the shallow plate type rotor case 8. The rotor section and the stator section are assembled so that the rotor magnet 7 is positioned outside the stator core 3 and so that these sections are opposed to each other to form gaps between the outer periphery of salient poles 3c of the stator core 3 and the rotor magnet 7 in the radial direction of the motor.

As shown in FIG. 2, a hollow cylindrical bearing holder 10 is inserted into a through hole 3a at the center of the stator core 3, a through hole 5a at the center of the core holder 5 and a through hole 9a of the circuit board 9, and the stator core 3 and the flange 10a of the bearing holder 10 are integrally fixed with the core holder 5 and the circuit board 9 therebetween by means of screws 11. The screws 11 function to firmly link the stator core 3 to the flange 10a of the bearing holder 10 with the core holder 5 and the circuit board 9 therebetween. Further, is supported inside of the bearing holder 10 rotary shaft 13 in a rotatable manner through a pair of radial ball bearings 12. A disc type spindle hub 14 is thrusted and fixed to the rotary shaft 13. Reference numeral 17 designates holes into which the screws 11 for fitting the core holder 5 to the stator core 3 are inserted.

Figure 3:
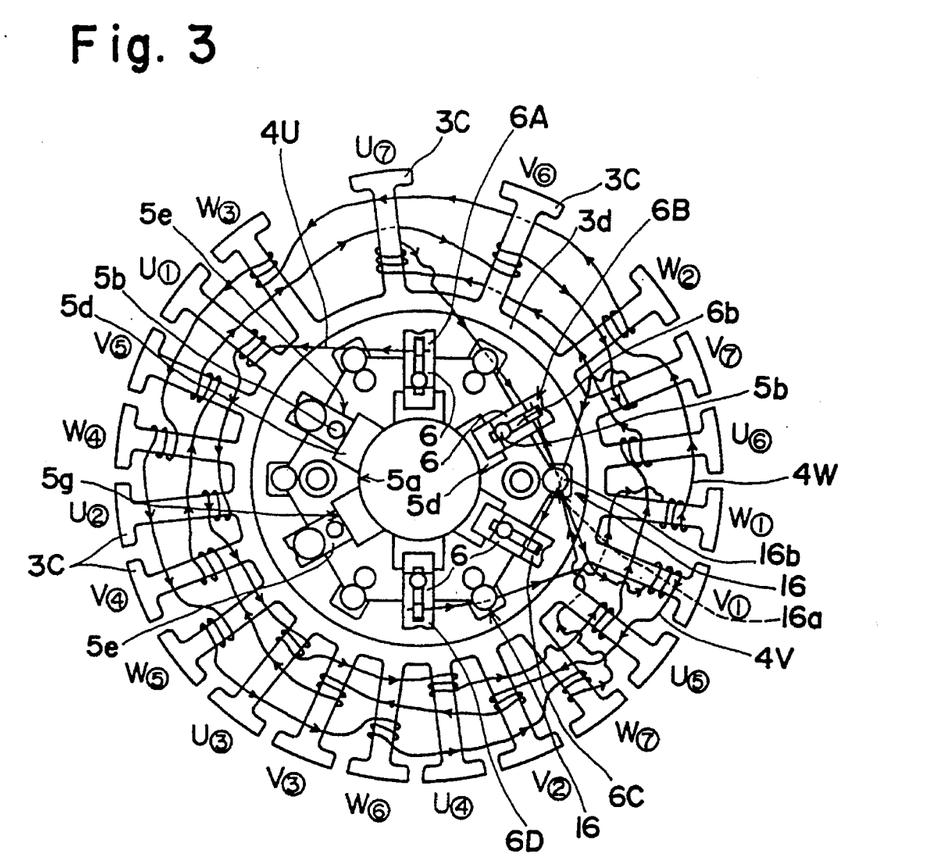
FIG. 3 is a plan view showing a core winding unit used in the motor illustrated in FIG. 1.
Figure 8B:
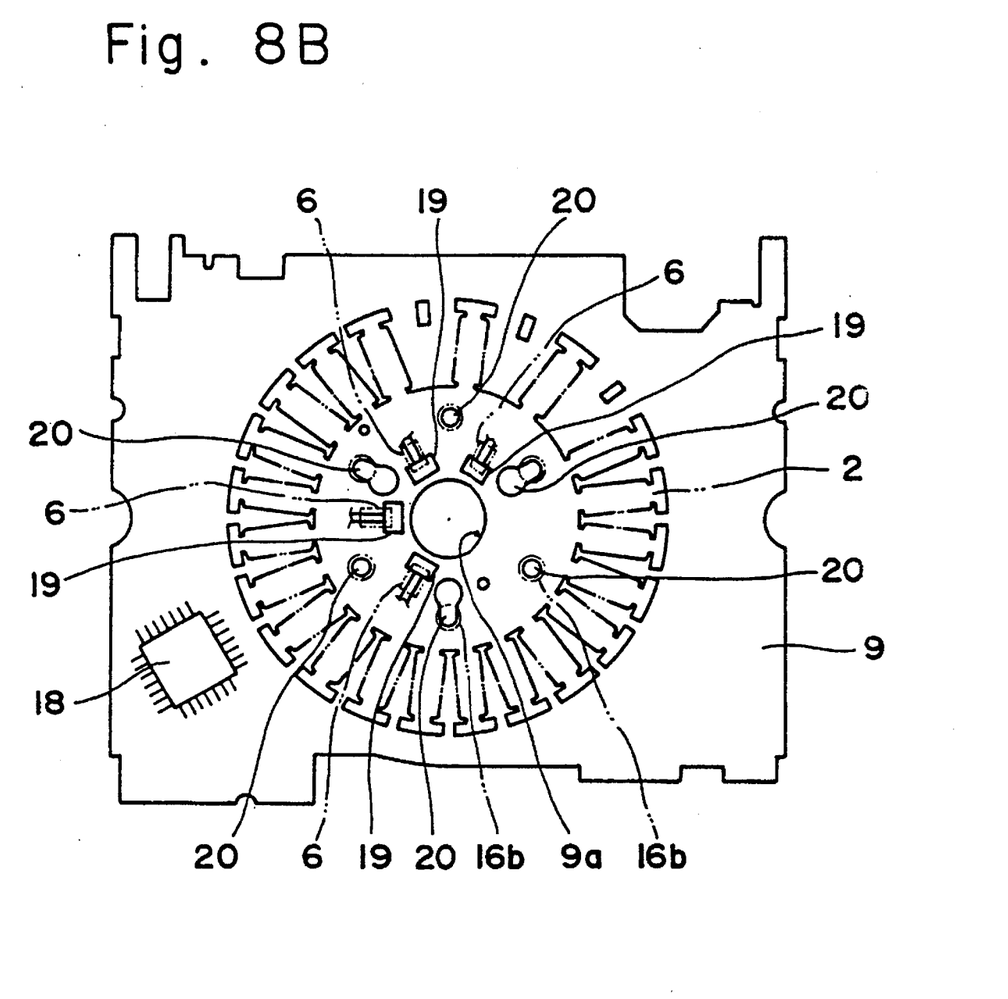
FIG. 8B is a plan view showing the state of connection between the core winding unit and the circuit board.

Referring to FIG. 3, the stator core 3 is formed by superimposing a plurality of magnetic plates each including a ring part 3d and a plurality of salient poles 3c radially protruding therefrom. The surface of each salient pole 3c of the stator core 3 is coated with the insulating material to form an insulating layer 3b thereon, and windings 4 are further wound to magnetize each salient pole 3c. The windings 4 are wound by dividing those by appropriate number of phases, e.g., U phase, V phase or W phase. As shown In FIG. 8B, the windings 4 in each phase are electrically connected by soldering or the like to each land part 19 of the driving circuit provided on the circuit board for driving the brushless motor through the terminal 6. Here, a plurality of salient poles 3c are provided in the radial direction at a constant pitch, and they are arranged in such a manner that magnetic pole sensors can not be affected by the leakage flux by eliminating the salient poles at positions to which the magnetic pole sensors are provided, as shown in FIG. 3. The magnetic pole sensors are located on the circuit board 9 at positions from which the salient poles 3c are removed.

Figure 4:
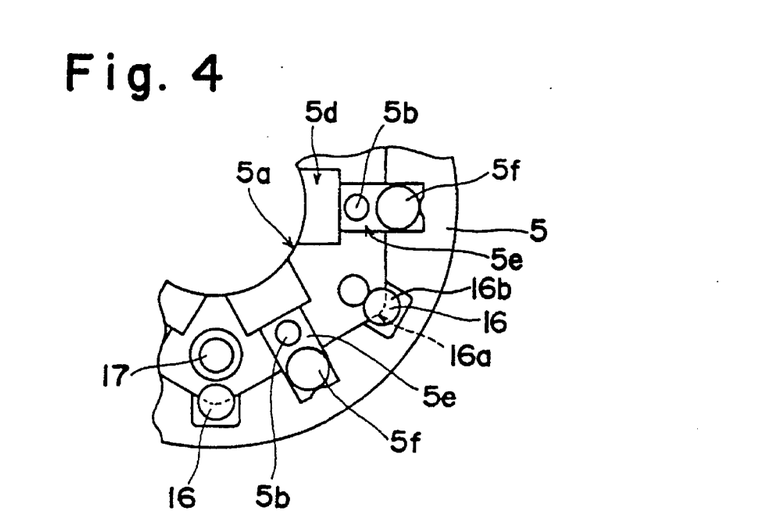
FIG. 4 is a plan view showing a part of a core holder.

The core holder 5 is constituted by an insulating resin type ring part and is fixed to a surface of the ring part 3d of the stator core on the circuit board 9 side so as to engage with the outer peripheral surface of the bearing holder 10. Although the core holder 5 is not restricted to a certain type, it is preferred to use one which is composed of a synthetic resin having a superior heat resisting and insulating property, for example, a synthetic resin in which a vitreous component is dispersed. In order to fix the terminals 6 to predetermined positions on a surface of the core holder 5 which faces the circuit board 9, the core holder 5 has stand portions having different heights in the thickness direction (the lamination direction; the axial direction of the rotary shaft 13) of the stator core 3, the stand portions forming a first mount part 5d and a second mount part 5e. In addition, the core holder 5 is provided with holder portions 5b on the surface facing to the circuit board 9 for the purpose of holding the terminals 6. In this embodiment, the holder portions 5b are projections of the pin type, and thrusted into holder portions 6a of a slit type through holes of the terminals 6. The pin-type projections/holder portions 5b protruding from the core holder 5 toward the circuit board 9 come into contact with the circuit board 9 and also function as positioners for positioning the stator core 3 in the axial direction. In this case, when the holder portions 6a composed of holes of the terminals 6 engage with the holder portions 5b of the core holder 5 to press down the terminals 6, the positioning and fixation of the terminals 6 can be simultaneously completed.

First mount parts 5d function to mount connection portions 6c of the terminals 6 thereon and support the connection portions 6c at positions where electrical connections with the land part 19 of the circuit board 9 are possible. The first mount parts 5d are formed at positions between the holder portions (positioner portions) 5b of the core holder 5 and the rotary shaft 13 in accordance with positions of each land part 19 of the driving circuit 18 formed on the circuit board 9. Namely, in this embodiment, land parts 19 of the driving circuit 18 are formed on the surface of the circuit board 9 so as to surround a through hole 9a of the circuit board 9.

In addition, second mount parts 5e on which clipping portions 6b of the terminals 6 are mounted are provided on the more hollowed portions than the first mount parts 5d so that the mount parts 5e are positioned apart from the circuit board 9. In such an arrangement, the space is formed between the circuit board 9 and the core holder 5, and the clipping portions 6b of the terminals 6 and the ends or the extending wires of windings 4 held thereby are disposed apart from the driving circuit 18 and others formed on the surface of the circuit board 9, thus preventing short circuit.

Further, windows 5f for passing electrodes 23A and 23B for fusing therethrough are formed by through holes at positions of the second mount parts 5e opposed to the holder portions 6b of the terminals 6. When fusing is effected as if the stator core 3 and the core holder 5 are fastened together by using the windows 5f, the ends or the extending wires of the windings 4 held by the clipping portions 6b of the terminals 6 are electrically connected to the terminals 6. The arrangement of the first mount parts 5d, the holder portions 5b and the second mount parts 5e are not limited to the illustrated example and may be modified in accordance with the configuration position of each land part 19 of the circuit board 9 or the shape of the core in the respective specification of the spindle motor 1. For example, the positions of the first mount parts 5d may be determined by the relationship with the land parts 19 of the driving circuit 18.

Figure 5:
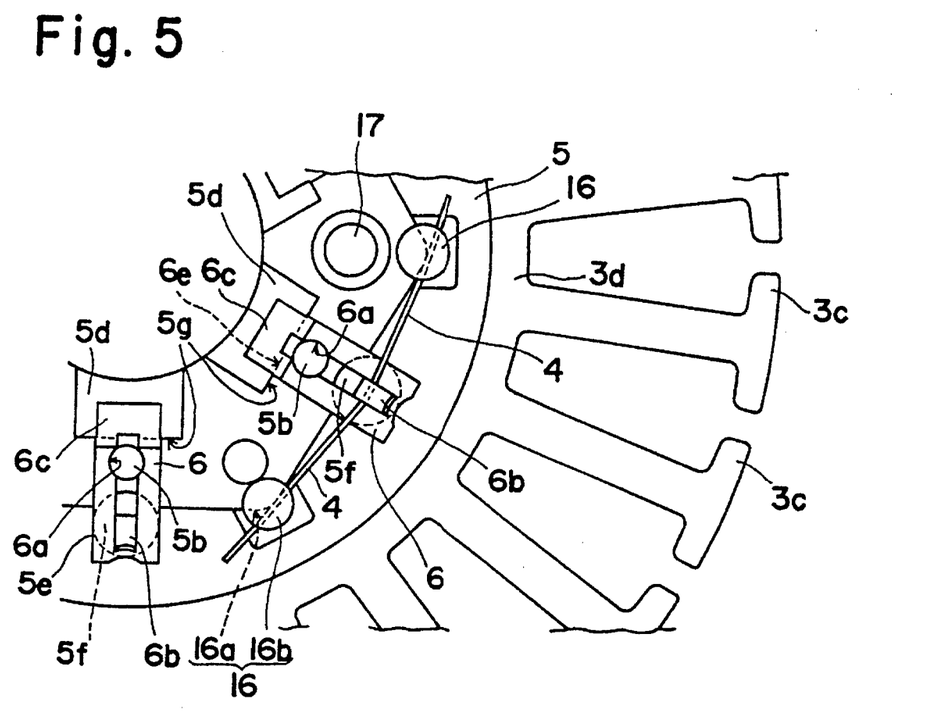
FIG. 5 is an enlarged plan view showing the relationship between the core holder and a stator core and the relationship between the core holder and an extending wire of a winding.

Furthermore, guide members 16 for preventing the extending wires of the windings 4 from sagging are disposed at both the left and right hand sides of each position of the core holder 5 to which each terminal 6 is fixed. These guide members 16 comprise guide parts 16a with which the ends or extending wires of the windings 4 stretched between the salient poles 3c and the terminals 6 are brought into contact and hood parts 16b protruding over the guide parts 16a. The fixing positions of the terminals 6 with respect to the core holder 5 are determined so that the windings 4 spreading from the clipping portions 6b of the terminals 6 are positioned rather outside (closer to the salient poles 3c) in comparison with the windings 4 spreading from the guide members 16. In such a configuration, the windings 4 are prevented from sagging. Although not shown, the circuit board 9 is provided with holes 20 so that the hood parts 16b partially engage at positions with which the hood parts 16b are brought into contact. These holes 20 function as positioners when the stator core 3 having the windings 4 and the core holder 5 assembled thereon is mounted on the circuit board 9. In addition, the screws 11 are inserted at positions close to the through holes 9a in relation to the holes 20.

Figures 7A, 7B, 8A:
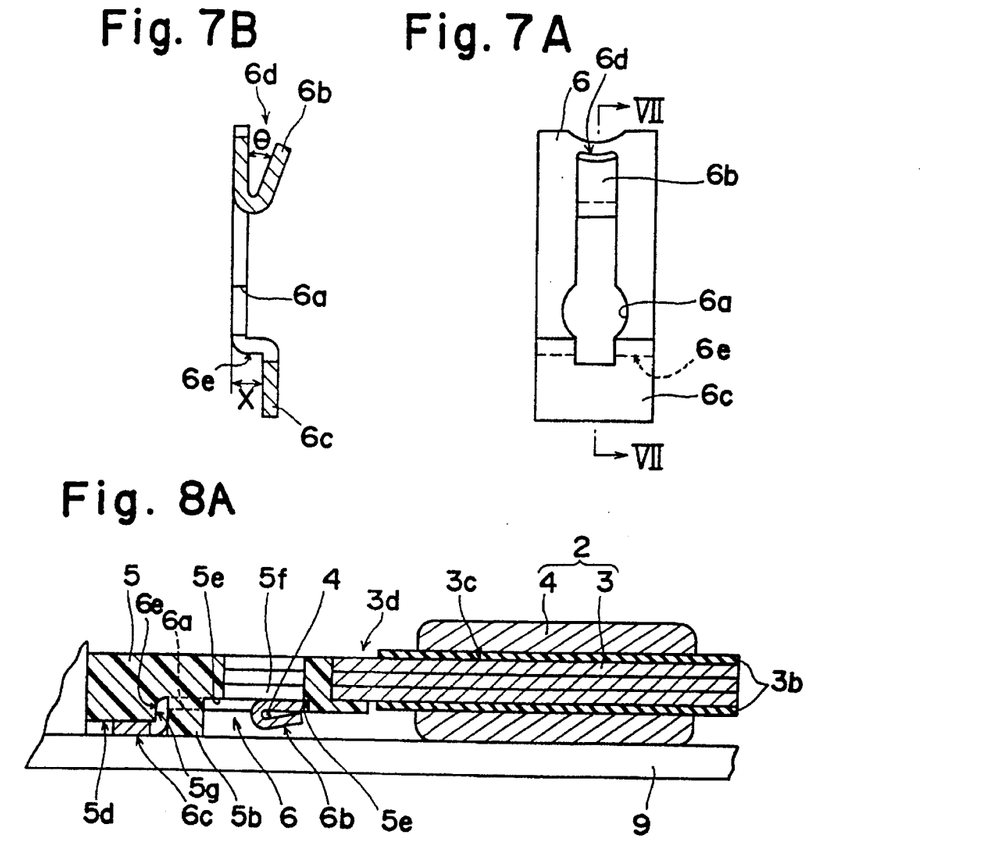
FIG. 7A is an enlarged plan view showing the terminal.
FIG. 7B is a sectional view along the line VII—VII of FIG. 7A.
FIG. 8A is an explanatory view showing the state of connection between the core winding unit and a circuit board.

The terminals 6 are composed of the conductive material in order to establish the electrical connection between the ends of the windings 4 and each land part 19 of the circuit board 9, and comprises the holder portions 6a constituted by slit-type through holes with which the pin-type holder portions 5b of the core holder 5 engage, the clipping portions 6b which hold and are electrically connected to the ends or extending wires of the windings 4, and the connection portions 6c electrically connected to the land parts 19 of the circuit board 9, as shown in FIG. 7. The clipping portions 6b oxidizes with the heat at fusing, thus the soldering material can not be attached to the holder portions 6b. Therefore, the clipping portions 6b can not be soldered to the circuit board 9, and the connection portions 6c are provided instead. Here, clipping portions 6b are obtained by cutting and bending parts of the terminals 6, and are formed in the simplified V shape so as to wrap the ends of the windings 4. As shown in FIG. 7, the clipping portions 6b are of course provided with V-shaped openings 6d each having a given angle θ before inserting the ends of the windings 4 therein. Accordingly, the temporal fixation of the ends of extending wires of the windings 4 can be facilitated in the winding process. After the insertions of the ends or extending wires of the windings 4, the openings 6d are bent and closed. Further, according to this embodiment, the connection portions 6c are formed on ends opposite to the other ends at which the clipping portions 6b are provided. At least the connection portions 6c are formed so as to be nearly parallel with and offset by the clipping portions 6b. In this embodiment, the terminals 6 are bent between the holder portions 6a and the connection portions 6c to become the crank state, and the clipping portions 6b and the holder portions 6a supported by the second mount parts 5e of the core holder 5 and the connection portions 6c supported by the first mount part 5d are formed substantially parallel with each other with difference in height x. Consequently, since step parts 6e are brought into contact with another step parts 5g between the first and second mount parts 5d and 5e on the core holder 5 side, the terminals 6 can be fixed substantially parallel with the circuit board 9 by only engaging the pin-type holder portions 5b with the holder portions 6b composed of the slit-type holes without causing any revolution or unsteadiness. Further, connection portions 6c are jointed to each land part 19 of the circuit board 9 by soldering. Although the windings 4 wound around each salient pole 3c of the stator core 3 seem to be brought into contact with the circuit board 9 in FIGS. 2 and 8A, an insulating layer is actually formed on the circuit board 9 and no electrical connection is hence established. Namely, the windings 4 wound around each salient pole 3c are electrically insulated from the circuit board 9.

When using the thus-configured core holder 5 and terminals 6, the winding method of windings 4 and the connection method between the ends of the windings 4 and the terminals 6 are as follows, for example.

FIG. 3 is an plan view showing a example of a winding process in the stator core 3 having the core holder 5 whose terminals 6 are provided nearly parallel with the circuit board 9. In this drawing, the windings 4 whose phase are selected as necessity requires, e.g., the U, V and W phase, are wound around each salient pole 3c of the stator core 3 in accordance with the following method. Here, ends of the windings 4 wound around the respective salient pole 3 allocated to the same phase are connected in series. The ends (for example, the front ends) on the side of the windings 4 of the respective phase make a total of three wires, while the other ends (for example, the rear ends) of the windings 4 of these three phases are regarded as one common wire. The total of the four wires are electrically star-connected to four terminals 6 (6A, 6B, 6C and 6D).

The windings 4 (4U, 4V and 4W) of the respective phase wound around each salient pole 3c of the stator core 3 are wound on each salient pole 3c in the following order, for example.

Referring to FIG. 3, the winding 4U in the U phase is first held and temporarily fixed by the clipping portion 6b of the terminal 6A. The winding 4U is then wound a predetermined number of times around the salient pole U① corresponding to the salient pole 3c in the U phase (the winding 4U is wound clockwise as seen from the tip of the salient pole 3c), and is further wound in order from the salient pole U② to salient pole U⑦ (the counterclockwise direction in FIG. 3). Subsequently, the winding 4 is held and temporarily fixed by the clipping portion 6b of the terminal 6B. In this way, the winding process is completed with respect to the U phase.

Next, the winding 4V in the V phase uses the winding 4U whose winding process has already been completed with respect to the terminal 6B as the extending wire and is wound around the salient pole V① in the V phase. The winding 4V is wound in a direction opposed to that of the winding 4U (namely, the winding 4V is wound counterclockwise as seen from the tip of the salient pole 3c), and is successively wound (clockwise) in the order from the salient pole V① to the salient pole V⑦ which correspond to the V phase. Then, the winding 4V is held and temporarily fixed by the clipping portion 6b of the terminal 6C. The winding process with respect to the V phase is finished in this way.

Next, the winding 4W in the W phase starts after it is first held and temporarily fixed by the clipping portion 6b of the terminal 6D. The winding 4W of this W phase is wound clockwise as seen from the tip of the salient pole 3c in the same manner as with the winding 4U. The winding 4W of the W phase is wound (counterclockwise) in sequence from the salient pole W①to the salient pole W⑦. Thereafter, the winding 4W is held and temporarily fixed by the clipping portion 6b of the terminal 6B. In this way, the winding process is completed with respect to the W phase. The terminal 6B is used as a terminal for the above-described common wire for the three phases (the U, V and W phases).

Figure 6:
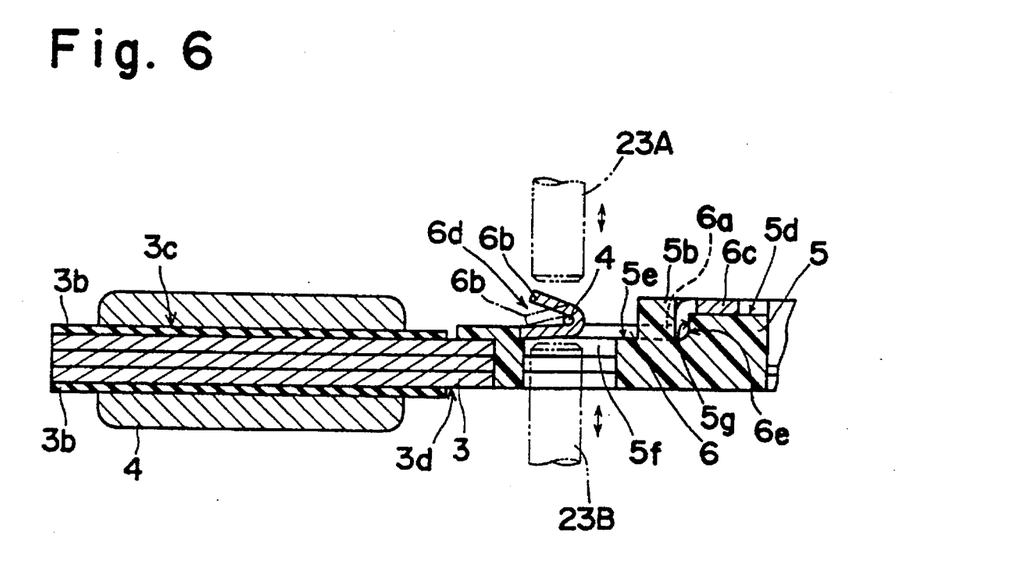
FIG. 6 is an explanatory view of the operation for fixing the winding to a terminal in the core winding unit.

In the above winding process, the operation of the extending wires of the windings 4, being fixed to the terminals 6 secured to the core holder 5 are practiced as shown in FIG. 6, for example. The windings 4 are first hooked by the guide members 16 of the core holders 5, and subsequently hooked by the adjacent guide members 16 while being inserted through the openings 6d of the clipping portions 6b of the terminals 6. Then, the clipping portions 6b are bent to close the openings 6d by using a metal fitting or the like from outside. At this time, the electrodes 23A and 23B for fusing may be also used to smash the clipping portions 6b.

Referring now to FIG. 6, fusing is effected as follows. That is, the electrodes 23A and 23B for fusing are provided in such a manner that the terminals 6 are sandwiched up and down by these two electrodes 23A and 23B by using the windows 5f, namely, those are disposed in the direction orthogonal to the stator core 3. With such an arrangement, the ends of windings 4 and the terminals 6 are electrically connected to each other. In the case of fusing in this way, it is not necessary to prepare any special space for the disposition of the electrodes for fusing between the core holder 5 and the clipping portions 6b of the terminals 6. Thus, it is enough to provide the space for preventing occurrence of the short circuit and others between the clipping portions 6b of the terminals 6 and the circuit board 9 in the state where the clipping portions 6b are completely secured by fusing. In addition, the space for facilitating insertion of the electrodes 23A and 23B for fusing is also formed in the stator core 3, since the windows 5f for fusing are provided inside the ring part 3d of the stator core 3.

As shown in FIGS. 8A and 8B, the stator core 3 having the core holder 5 whose winding ends 4 and terminals 6 are electrically connected is mounted on the circuit board 9 in such a manner that the connection portions 6c of the terminals 6 come into contact with cream solders applied to the respective land part 19 of the driving circuit 18. At the same time, the electric component members are also mounted on the other portions of the circuit board 9 via cream solders. Then, the terminals 6 and electric parts are simultaneously soldered to the circuit board 9 by reflow soldering to the circuit board 9.

According to the above-described first embodiment, since the terminals 6 are connected to the ends of the windings 4 and has clipping portions 6b and connection portions 6c nearly parallel to the circuit board 9 being provided so as to be nearly transverse with respect to the core holder 5, the thickness of the terminals 6 can be reduced. Consequently, the space between the core holder 5 and the circuit board 9 can be reduced to the necessary minimum, thereby thinning the brushless motor. Further, partly since terminals 6 are connected to the windings 4 of each phase, and partly since the connection portions 6c of terminals 6 are provided at positions where the electrical connections with land parts 19 of the driving circuit 18 formed on the circuit board 9 are possible, the core winding unit 2 and other electric component members can be simultaneously soldered to the circuit board 9 by simply mounting the unit 2 on the circuit board 9 via cream solder or the like, reducing the processing steps and the manufacturing cost.

Figure 11:
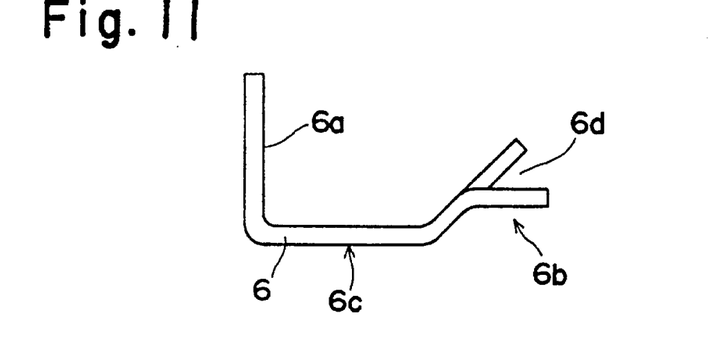
FIG. 11 is an enlarged side elevation showing a further embodiment of the terminal.

It should be understood that the present invention has been described in several preferred embodiments and is not limited thereto, but other various modifications may be applied to the invention without departing from the gist and scope thereof. For example, the terminals 6 are not restricted to the illustrated shape according to the first embodiment, and it may serve as well to form the clipping portions 6b so such a manner that the openings 6d face the core holder 5 and the clipping portions 6b are provided within the windows 5f for fusing, as shown in FIG. 11. In such case, since the holder portions 6a of the terminals 6 are bent and thrusted into the holder portions 5b which are holes of the core holder 5, the terminals 6 are fixed to the core holder 5. When these arrangements are adopted, the terminals 6 will not be lifted or come off from the core holder 5, and secure fixations are enabled, resulting in assured contact with the land parts 19.

Figure 9:
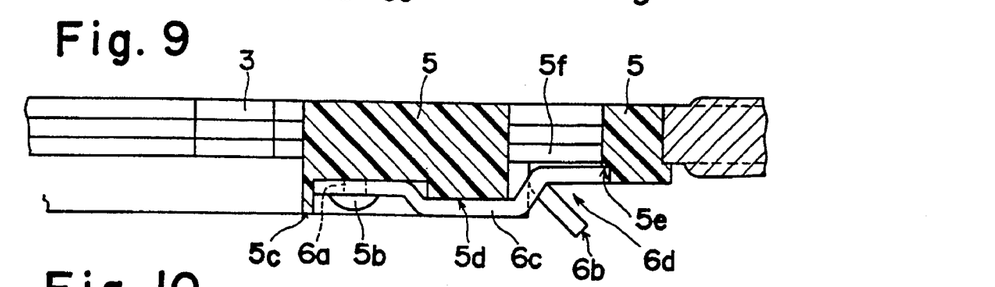
FIG. 9 is an enlarged sectional view showing a primary part of another embodiment of the core holder and the terminal.

FIG. 9 shows a second embodiment. In this embodiment, the terminals 6 are disposed to the core holder 5 by heat welding. When using the core holder 5 of the thermoplastic resin material, terminals 6 can be easily provided by its holes. For example, pin-type holder portions 5b piercing through holder portions 6a which are the holes of the terminals 6 are monobloc-molded so as to protrude from the core holder 5, and tips of the pin-type holder portions 5b are plastic and are deformed into the riveted structure by applying heat thereto. As a result, the terminals 6 can be fixed. In such case, the terminals 6 are provided with clipping portions 6b at one set of ends and holder portions 6a at the other set of ends and connection portions 6c are formed between these portions 6a and 6b. The connection portions 6c are supported by first mount parts 5d of the core holder 5, while the clipping portions 6b are supported by second mount parts. Since the terminals 6 can not be lifted or come off from the core holder 5 and the fixations are assured, the terminals 6 are securely brought into contact with land parts 19, in this example. Reference numeral 5c designates positioner portions which come into contact with a circuit board 9 and position a stator core 3 in the axial direction (lamination direction).

Figure 10:
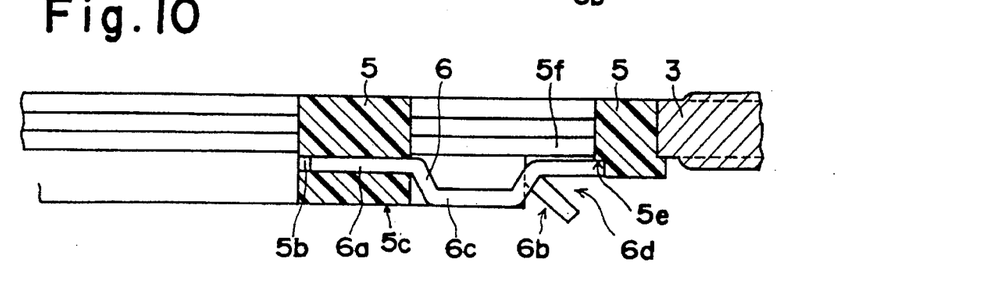
FIG. 10 is an enlarged sectional view showing a primary part of still another embodiment of the core holder and the terminal.

FIG. 10 shows a third embodiment. Terminals 6 are forced into a core holder 5 in this embodiment. Holder portions 6a at the ends of the terminals 6 are forced into holder portions 5b which are radial holes formed in stand portions of the core holder 5 in a radial direction, whereby the terminals 6 are fixed in the core holder 5. The connection parts 6c which curve and project toward the circuit board 9 are formed between forced ends 6a and clipping portions 6b for holding extending wires, and these connection portions 6c are soldered to land parts 19 of a circuit board 9. In this embodiment, it is not necessary to form holder portions each having a complicated structure to the terminal 6 or the core holder 5, thus easily constructing the terminals 6 and the core holder 5.

Figure 12:
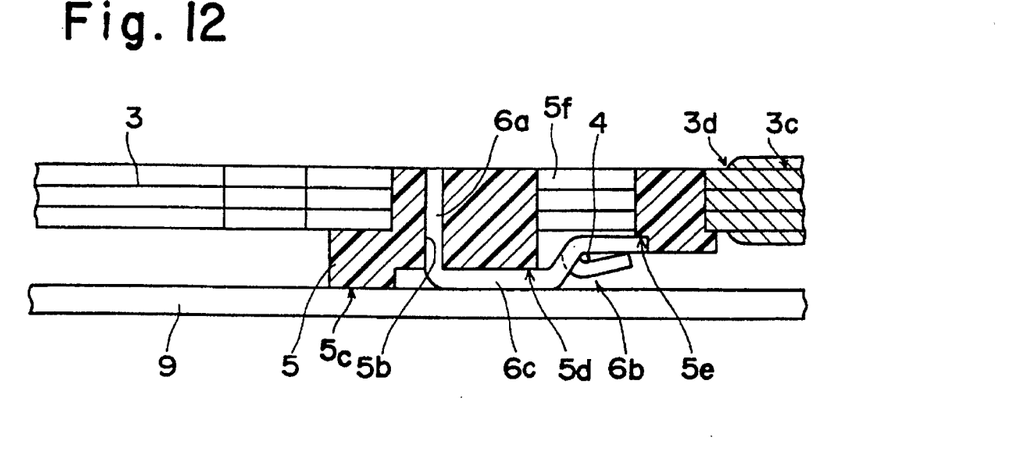
FIG. 12 is an enlarged sectional view showing a primary part of a still further embodiment of the core holder and the terminal.

A fourth embodiment is illustrated in FIG. 12. In this embodiment, holder portions 6a, which are ends of terminals 6, are pressed into a core holder 5 in the axial direction, and clipping portions 6b and connection portions 6c are bent in a radial direction. The terminals 6 comprise the connection portions 6c orthogonally curving from holder portions 6a forced into the core holder 5 and the connection portions 6b which are bent and temporarily secure windings 4. The connection portion 6c protrude toward a circuit board 9 with the terminals 6 being disposed to the core holder 5. In this embodiment, since there is no need of working to form any holder having a complicated structure onto the terminals 6 or core holder 5, the terminals 6 and the core holder 5 can be easily configured. Reference numeral 5c denotes positioner portions.

According the above-described second to fourth embodiments, since the transverse installation of the terminals 6 to the core holder 5 is common to all the embodiments, the same effect can be obtained as in the first embodiment. In other words, as long as the terminals are provided to reduce another thickness as modifications of the present invention, the mounting thereof need not be restricted to any specific structure.

While the foregoing description and drawings represent the preferred embodiments of the present invention, it will be obvious to those skilled in the art that various changes and modifications may be made therein without departing from the true spirit and scope of the present invention.

What is claimed is:

1. A brushless motor comprising:

a rotor section having a rotor magnet;

a stator section having windings opposed to said rotor magnet in the radial direction of said motor and a stator core around which said windings are wound;

a driving circuit formed on a circuit board electrically connected to said windings wound around said stator core;

terminals, including clipping portions which holds and are electrically connected to said windings and connection portions electrically connected to land parts of said driving circuit formed on said circuit board, which reposition electrical connections between said windings and said driving circuit; and a core holder for holding said terminals, said terminals being provided to said core holder on a surface opposed to said circuit board;

at least said clipping portions and said connection portions being arranged substantially parallel with said circuit board; and said connection portions being nearer to said circuit board than said clipping portions;

wherein said core holder has first mount parts for mounting and supporting said connection portions of said terminals thereon at positions where said connection portions can be electrically connected to said land parts of said circuit board; and second mount parts for mounting and supporting said clipping portions of said terminals thereon at positions where said clipping portions are apart from said circuit board, and wherein said first and second mount parts are constituted by stand portions having a different height from each other in the thickness direction of said stator core.

2. A brushless motor as set forth in claim 1, wherein said core holder has: holder portions for holding said terminals; and positioner portions which are brought into contact with said stator core and said circuit board and which position said stator core in the thickness direction thereof.

3. A brushless motor as set forth in claim 2, wherein said core holder are provided with pin-type holder portions and wherein said terminals are provided with holder portions composed of through holes which engage with said pin-type holder portions of said core holder.

4. A brushless motor as set forth in claim 1, wherein guide parts for preventing extending wires of said windings from sagging are formed between said terminals in said core holder.

5. A brushless motor as set forth in claim 1, wherein one end of each of said terminals is forced and fixed in said core holder.

6. A brushless motor as set forth in claim 1, wherein said terminals are fixed to said core holder by heating and deforming part of said core holder.

7. A brushless motor as set forth in claim 1, wherein said core holder is provided with holes for inserting an electrode for fusing therethrough at positions where said clipping portions of said terminals are disposed.

8. A brushless motor comprising:

a rotor section having a rotor magnet;

a stator section having windings opposed to said rotor magnet in the radial direction of said motor and a stator core around which said windings are wound;

a driving circuit formed on a circuit board electrically connected to said windings wound around said stator core;

terminals, including clipping portions which holds and are electrically connected to said windings and connection portions electrically connected to land parts of said driving circuit formed on said circuit board, which reposition electrical connections between said windings and said driving circuit; and a core holder for holding said terminals, said terminals being provided to said core holder on a surface opposed to said circuit board;

at least said clipping portions and said connection portions being arranged substantially parallel with said circuit board; and said connection portions being nearer to said circuit board than said clipping portions;

wherein said core holder has holder portions for holding said terminals; and positioner portions which are brought into contact with said stator core and said circuit board and position said stator core in the thickness direction thereof; and wherein said holder portions of said core holder also function as positioner portions which are brought into contact with said circuit board and position said stator core in the thickness direction thereof.

9. A brushless motor comprising:

a rotor section having a rotor magnet;

a stator section having windings opposed to said rotor magnet in the radial direction of said motor and a stator core around which said windings are wound;

a driving circuit formed on a circuit board electrically connected to said windings wound around said stator core;

terminals, including clipping portions which holds and are electrically connected to said windings and connection portions electrically connected to land parts of said driving circuit formed on said circuit board, which reposition electrical connections between said windings and said driving circuit; and a core holder for holding said terminals, said terminals being provided to said core holder on a surface opposed to said circuit board;

at least said clipping portions and said connection portions being arranged substantially parallel with said circuit board; and said connection portions being nearer to said circuit board than said clipping portions; and wherein one end of each of said terminals is fixed to said core holder and the other end of the same is supported by said core holder by forming a clipping portion thereto, and a connection portion is formed between these two ends and protrudes to be nearer to said circuit board than said clipping portion.

* * * * *